United States Patent [19]
Baughman et al.

[11] Patent Number: 5,104,752
[45] Date of Patent: Apr. 14, 1992

[54] DUAL, SERIES/PARALLEL BATTERY CELL CONNECTS

[75] Inventors: Ray H. Baughman, Morris Plains; Charles Becht, IV, Morristown; Lawrence W. Shacklette, Maplewood, all of N.J.

[73] Assignee: Allied-Signal, Inc., Morris Township, Morris County, N.J.

[21] Appl. No.: 597,911

[22] Filed: Oct. 15, 1990

[51] Int. Cl.$^5$ .................................. H01M 2/20
[52] U.S. Cl. .................................. 429/1; 429/123; 429/158; 429/178
[58] Field of Search ............ 429/1, 123, 157, 158, 429/178, 179

[56] References Cited

U.S. PATENT DOCUMENTS

4,622,274 11/1986 Lowrance .................................. 429/1

Primary Examiner—William R. Dixon, Jr.
Assistant Examiner—Paul Marcantoni
Attorney, Agent, or Firm—Ernest D. Buff; Gerhard H. Fuchs

[57] ABSTRACT

A cell has a body containing at least one electroactive material. The body has both a positive electrical connecting means and a negative electrical connecting means on each of opposite ends of said body. Each of the negative and positive electrical connecting means is positioned such that the cell can be alternatively directly connected electrically in series or in parallel to form a battery power source.

24 Claims, 7 Drawing Sheets

DUAL, SERIES/PARALLEL BATTERY CELL CONNECTS

FIELD OF THE INVENTION

The present invention relates to batteries and specific means to enable separate cells to be electrically connected alternately in series or in parallel.

BACKGROUND OF THE INVENTION

Cylindrical, "flashlight type", battery cells are generally constructed with a positive electrode connection on one end and a negative electrode connection on the opposite end. When placed end-to-end, these batteries are connected in series. For example, if two C or D size batteries (1.5 volts each) are connected end-to-end, a net voltage potential of 3 volts is realized.

There are applications where a lower voltage (e.g., 1.5 net volts with two 1.5 volt cells), higher coulombic capacity, and higher discharge rate may be desirable. Further, improvements in the art have resulted in 3 volt cells, such as are provided by the $Li/MnO_2$ and $Li/CF_x$ couples. It would be desirable if these higher voltage cells could be used in battery operated devices designed for 1.5 volt cells in series without making any modifications to such devices. The uses described hereinabove require means for connecting the cells together in parallel.

SUMMARY OF THE INVENTION

The present invention provides means for using cells optionally connected in parallel, or in series when placed end-to-end. Advantageously, no modification of any device external to the battery cells is required. When the cell is configured to provide either series or parallel electrical connection, changing from one to the other merely requires changing the relative rotational orientation of adjacent cells.

Briefly stated, the invention provides cells that can be electrically connected in parallel, although the cells are stacked in a series (i.e., end-to-end) configuration. Parallel-only connection can be provided, or parallel/series dual capability. With dual capability, the invention provides battery cells that can be connected in series or parallel by a relative rotation between adjacent cells in a stack.

Six embodiments are provided. The first embodiment uses a central, approximately rectangular pin and socket. Both the pin and socket have contacts for positive and negative electrodes. Switching from series to parallel connection is accomplished by rotating one cell 180° about its axis relative to the other cell (See FIGS. 1 through 3).

Figure 4:
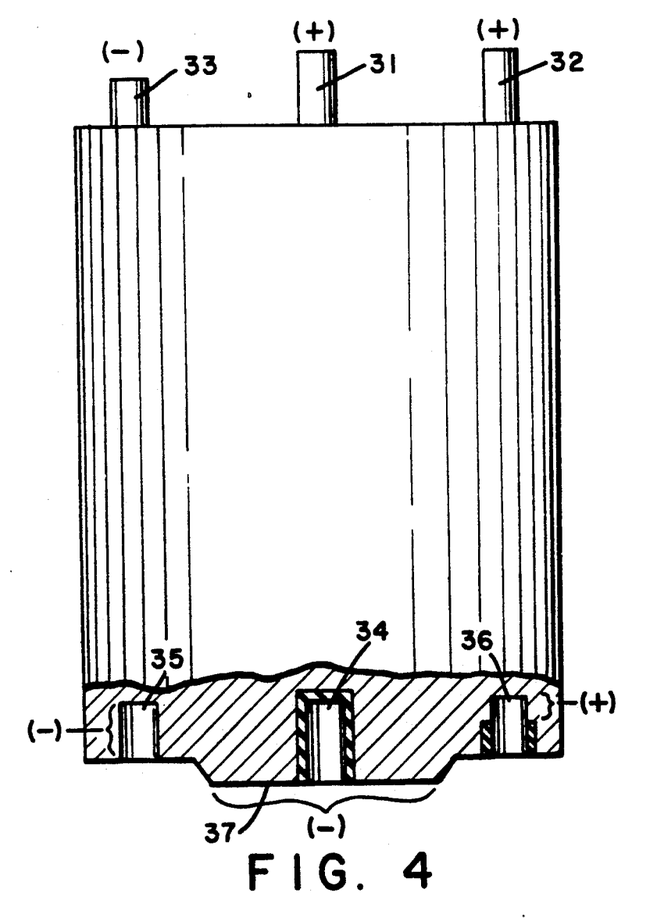
FIGS. 4 and 5a-5b are side views of a battery incorporating an alternate embodiment of the invention wherein a central pin and two peripheral pins are used.
Figure 5A:
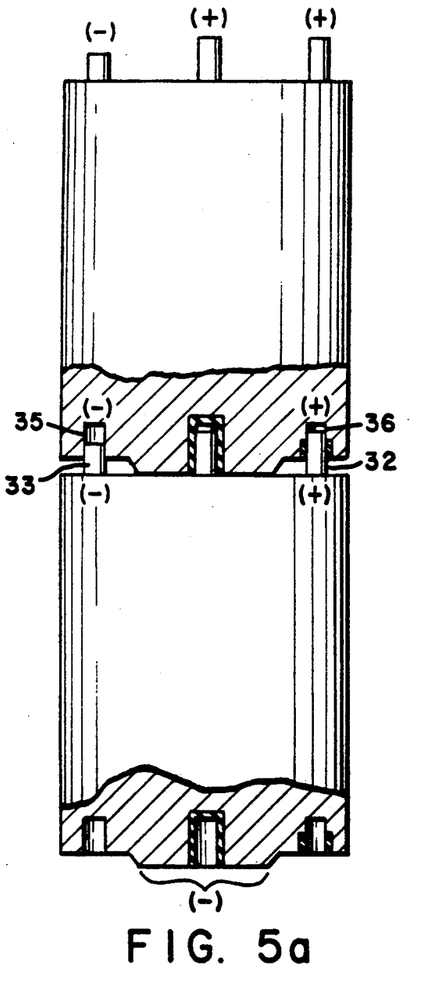
Figure 5B:
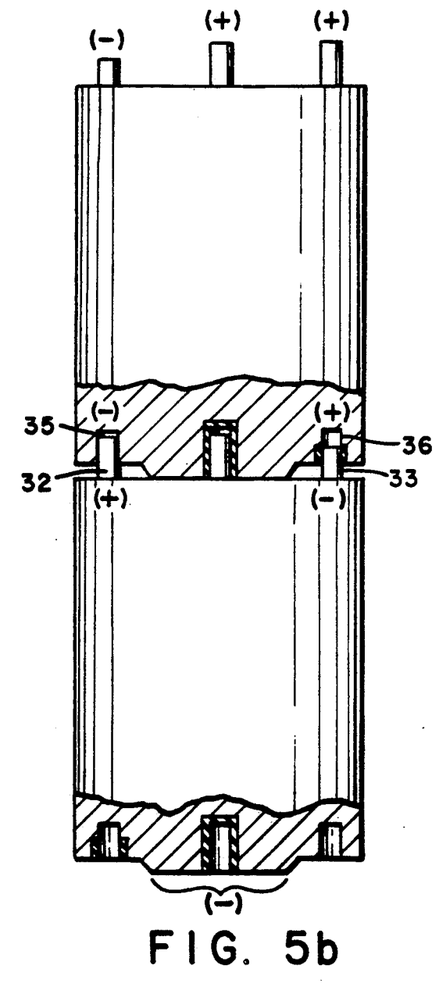

The second embodiment of the invention uses a central and two peripheral pins with matching sockets (See FIGS. 4 and 5). Switching from series to parallel is accomplished in the same way as with the first embodiment.

The third embodiment uses a central electrode pin and socket and peripheral prongs and sockets located 180° apart (See FIG. 6). Switching from series to parallel connection is accomplished in the same way as with the first embodiment.

The fourth embodiment uses a central electrode pin and socket and peripheral prongs and sockets. The prongs are located 90° apart and the peripheral sockets are located in three quadrants (See FIG. 7). Switching from series to parallel is accomplished by rotating one cell 90° about its axis relative to the other cell.

Figure 9:
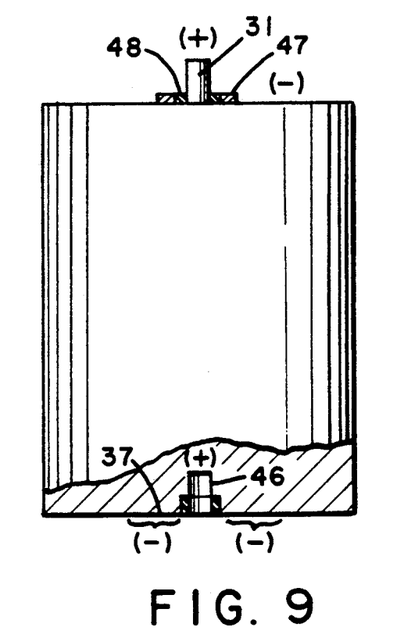
FIG. 9 is a side view depicting another embodiment of the invention which is a parallel-connection-only type of cell.

The fifth embodiment is exclusively a parallel-connect type of cell that uses a central positive electrode pin surrounded by an annular negative electrode plate on one end and a corresponding positive electrode socket and negative electrode surface on the other end (See FIG. 9). Aligning the cells in series in a stack results in parallel electrical connection between the cells.

Figure 10:
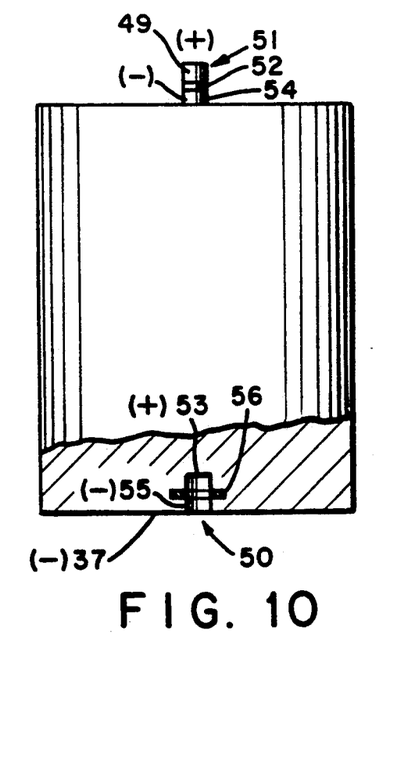
FIG. 10 is a side view depicting yet another parallel-connection only embodiment of the invention.

The sixth embodiment is exclusively a parallel-connect type of cell which uses a central dual-electrode pin and dual electrode socket (See FIG. 10). Aligning the cells in series in a stack results in parallel electrical connection between the cells.

BRIEF DESCRIPTION OF THE DRAWINGS

The invention will be more fully understood and further applications will become apparent when reference is made to the following detailed description of the preferred embodiments of the invention and the accompanying drawings, in which.

DETAILED DESCRIPTION OF THE INVENTION

Six embodiments of the invention are described herein, and are illustrated by the drawings.

Figure 1A:
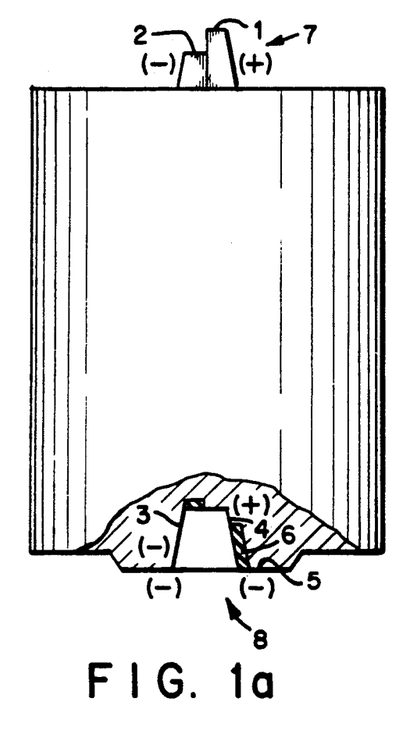
FIGS. 1a and 2 are side views of a battery incorporating a first embodiment of the invention wherein a central dual electrode pin is used.

Referring to FIG. 1a of the drawings, a battery incorporating the preferred embodiment of the invention uses a central two-electrode pin 7, on one end and a two electrode socket 8 on the opposite end. The surface between positive electrode 1 and negative electrode 2 is insulated, as well as the three adjacent exterior sides of the negative electrode 2, to minimize the potential for shorting the battery. The side of the negative electrode 2 opposite the positive electrode 1 is uninsulated. The two electrode socket 8 is configured to receive the two electrode pin 7 and has a negative electrode surface 3 and positive electrode surface 4 as well as nonconducting surfaces shown cross-hatched.

When used by itself or when the cell is on either end of a stack of cells, the positive electrode 1 is the contact on one end and a negative surface 5 is the contact on the opposite end. In the embodiment shown, the battery ends are suited for conventional applications without modification to electronic devices typically used therewith.

The pin 7 is squared to prevent relative rotation once the batteries are connected. Further, it is tapered to improve the surface pressure and thus electrical contact.

The connection between the cells can be adjusted for series or parallel connection as follows. For a series connection, shown in FIG. 1b, the pin 7 is inserted into the socket 8 with the positive electrode 1 against the negative side 3 of the socket 8. The negative electrode 2 is not in electrical contact with the adjacent battery, but is disposed against a nonconducting surface 6. Thus, the stacked cells are connected in series.

Figure 1B:
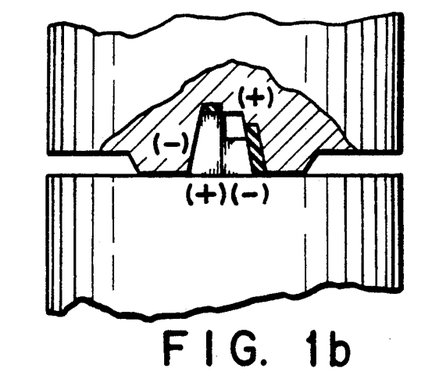
FIGS. 1b and 1c are side views broken away from the battery shown in FIG. 1, to illustrate series and parallel connections, respectively.
Figure 1C:
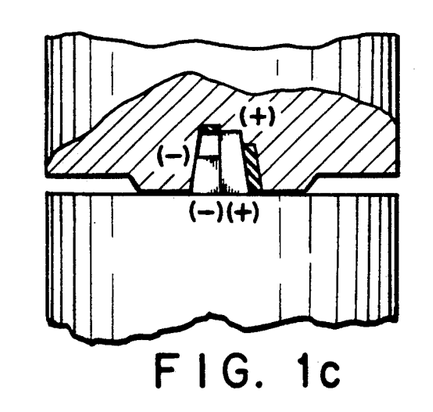

For a parallel connection, shown in FIG. 1c, the pin 7 is rotated 180° relative to the socket 8 with respect to the position for the series connection. The negative electrode 2 is in electrical contact with the negative surface 3 of the socket 8 and the positive electrode 1 is in electrical contact with the positive surface 4 of the socket 8. Thus, stacked cells are connected in parallel.

In use, the present invention permits significant flexibility in matching voltage requirements and optimizing battery life (e.g., by connecting higher voltage batteries in parallel rather than lower voltage batteries in series). Advantageously, four 3-volt cells in a stack can be connected to achieve a total potential of 3, 6, 9, or 12 volts. The 3, 6 and 12 volt configurations are preferred.

Figure 2:
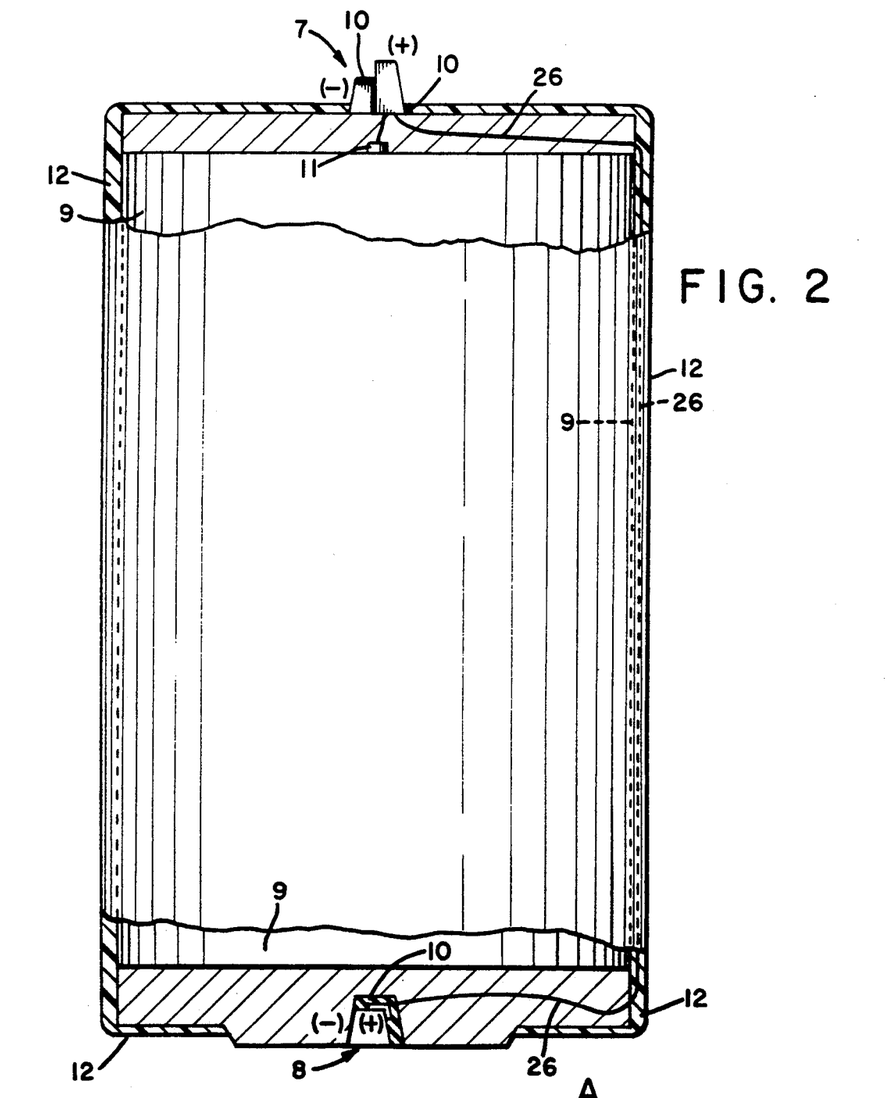

FIG. 2 shows typical details of cell construction. The sides and top and bottom of the metallic battery encasement can 9 are negative (as in conventional cylindrical flashlight batteries), except for regions of pin 7 and socket 8, which are positive and are separated from the can by insulators 10. Electrical connection between the positive electrode of pin 7, the positive electrode of socket 8, and the positive cell electrode 11 is via an insulated ribbon or wire connection 26. A plastic film 12 is used as a surface layer on the battery to provide electrical insulation.

Figure 3A:
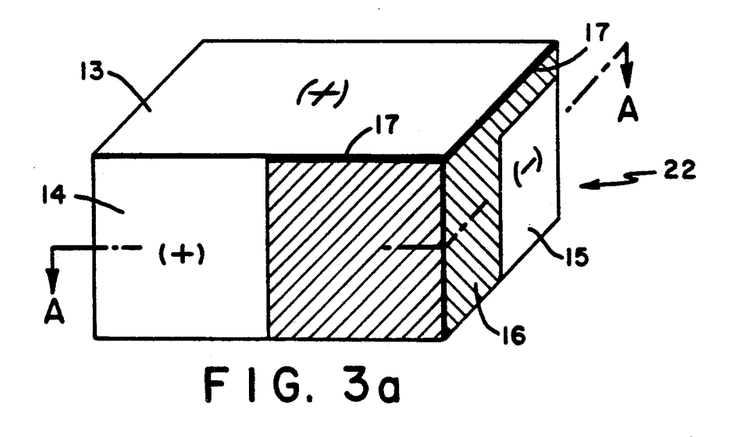
FIGS. 3a-3c are diagrammatic drawings depicting an alternate pin and socket design for the preferred embodiment.
Figure 3B:
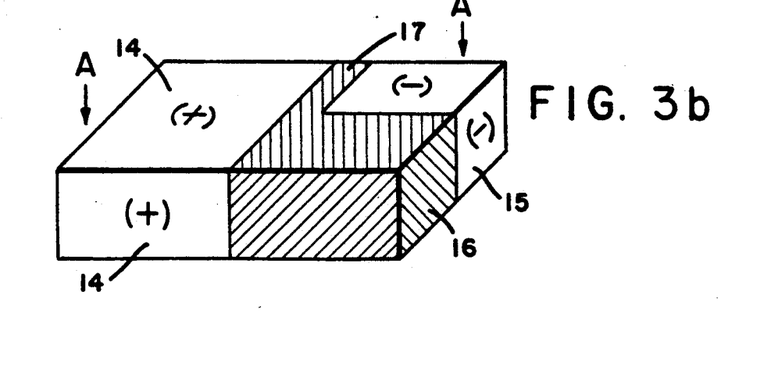

An alternate pin and socket design in illustrated in FIG. 3 for the preferred embodiment. FIG. 3a shows the alternate pin 22 and 3b shows pin 22 cut on Section A—A. The entire top surface 13 of pin 22 is positive, as well as section 14, which includes two adjacent quadrants of pin 22. One quadrant 15 of pin 22 is negative and the remaining quadrant 16 is neutral. The negative quadrant 15 is separated from the positive section 14 of pin 22 and the top surface 13 thereof by an insulating layer 17. The bottom 18 of the socket 23 is neutral. The side and half sides 19 of socket 23 are negative. The sides 20, 21 for the other two quarters of the socket 23 are neutral and positive, respectively.

Figure 3C:
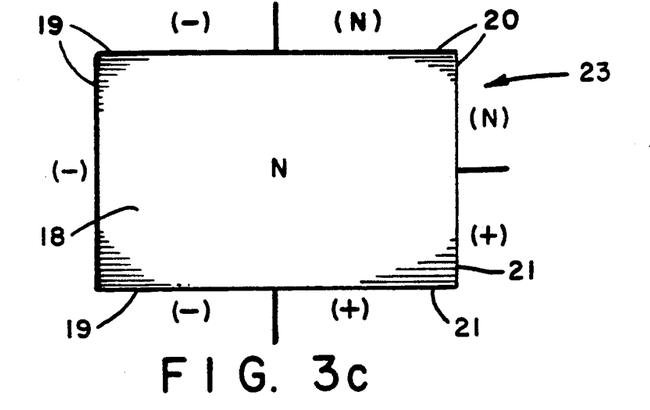

When the cells are connected in series, the positive section 14 of pin 22 is inserted in contact with the negative section 19 of the socket 23. The negative section 15 of the pin 22 is against the neutral socket walls 20 and is thus not in electrical contact. When the cells are connected in parallel, the pin is rotated 180° (relative to the socket 23) from the series orientation. Thus, the positive section 14 of pin 22 is in electrical contact with the positive section 21 of the socket 23 and the negative section 15 of pin 22 is in electrical contact with the negative section 19 of the socket 23.

FIG. 4 shows an alternate embodiment where three electrodes are used. A central positive electrode 31 provides the proper end connection to use in standard electrical devices. Outboard positive electrode pin 32 and shorter negative pin 33 are provided. Each of these electrodes is disposed along a line so that the peripheral pins are located 180° apart. Three sockets 34, 35, and 36 are provided. Central socket 34 is nonconducting. Negative socket 35 and positive socket 36 are disposed along a line so that the peripheral sockets are located 180° apart. Part of positive socket 36 is nonconducting and shown cross-hatched. A negative surface 37 provides the proper end connection to use in standard electrical devices.

FIG. 5 shows how series and parallel connections are achieved in this embodiment of the invention. For a series connection, depicted on the side view in FIG. 5b, the positive outboard electrode 32 is inserted into the negative socket 35 and the negative outboard electrode 33 is inserted in the positive socket 36. However, the negative outboard electrode 33 is not in electrical contact since it is adapted to insert solely into the neutral (i.e., insulated) part of the socket (i.e., the negative electrode is not long enough to establish electrical contact with the positive part of the socket).

For a parallel connection, depicted in the side view in FIG. 5a, the negative electrode 33 is inserted into the negative socket 35 and the positive electrode pin 32 has sufficient length to permit it to establish electrical contact with the positive part of the positive socket 36.

Various modifications of the cell design of FIG. 4 can be usefully employed, and are applicable to many of the alternate cell designs described herein. For example, the peripheral sockets and peripheral pins of FIG. 4 can be interchanged, so that the top of the battery contains the original central positive pin and two female sockets (one positive and the other negative) and the bottom of the cell contains the original central socket and two peripheral pins (one positive and the other negative). Similarly, the pins and sockets can be conveniently configured (for example, using springs in the sockets) so as to minimize contact electrical resistance via the employment of lateral mechanical forces. Additionally, the displacement of a spring-activated switch can be employed in socket 36, which will make electrical contact to the positive electrode for the long pin (pin 32), but not for the short pin (pin 33).

In a third embodiment of the invention, shown in FIG. 6, plate shaped prong connectors are used rather than pins. Top and bottom views of such a cell are depicted by FIGS. 6a through 6d. A central positive electrode 31 provides the standard end connection. When cells are placed end-to-end, this electrode fits into a neutral socket 34. A negative surface 37 surrounds this neutral socket 34 to provide the standard negative end. A positive prong 39 is provided on one side and a halfwidth negative prong 40 is provided on the opposite side. On the other end of the battery, a full width negative slot 41 is provided on one side and a slot that is less than half positive 42, and neutral 43 for the remainder, is provided on the other side.

Figure 6A:
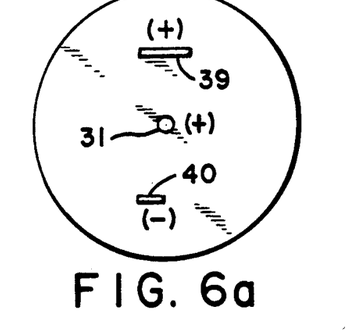
FIGS. 6a-6d are diagrammatic drawings depicting yet another alternate embodiment of the invention wherein plate-type prong connectors are used.
Figure 6B:
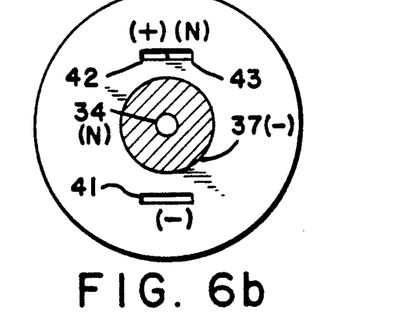

FIGS. 6a and 6b illustrate the orientation of the prongs relative to the slots for parallel electrical connection. Positive electrode prong 39 inserts into slot 42 and 43 and is in electrical contact with positive electrode 42. Positive electrode pin 31 is inserted into neutral socket 34 and makes no electrical connection. Negative electrode prong 40 inserts into negative electrode slot 41 and is in electrical contact. The cells are thereby electrically connected in parallel.

Figure 6C:
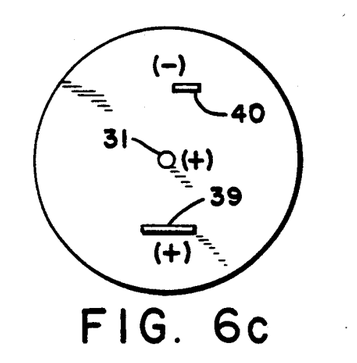
Figure 6D:
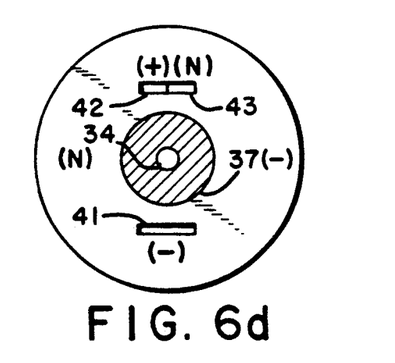

FIGS. 6c and 6d illustrate the orientation of the prongs relative to the slots for series connection. Positive electrode prong 39 inserts into and is in electrical contact with negative electrode slot 41. Positive electrode pin 31 is inserted into neutral socket 34 and makes no electrical connection. Negative electrode prong 40 inserts into slot 42 and 43 and is disposed within the neutral portion 43 of said slot and makes no electrical connection. The cells are thereby electrically connected in series.

In a fourth embodiment of the invention, shown in FIG. 7, an alternate configuration of plate type prong connectors are depicted. Top and bottom views of such a cell are depicted by FIGS. 7a through 7d. A central positive electrode 31 provides the standard end connection. When the cells are placed end-to-end, this electrode fits into a neutral socket 34 and thereby makes no electrical connection. A negative surface 37 surrounds said neutral socket 34 to provide the standard negative end. A positive peripheral prong electrode 39 is provided on one side of central electrode 31 and a negative peripheral prong electrode 40 is provided 90° from positive prong electrode 39. The opposite end of the cell contains peripheral positive electrode slot 44, peripheral neutral slot 45 located 180° from positive electrode slot 44, and peripheral negative electrode slot 41 located 90° from positive electrode slot 44.

Figure 7A:
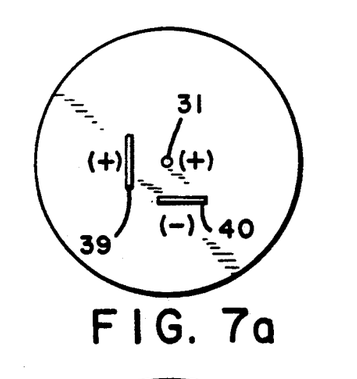
FIGS. 7a-7d are diagrammatic drawings depicting yet another alternate embodiment of the invention wherein plate-type prong connectors are used.
Figure 7B:
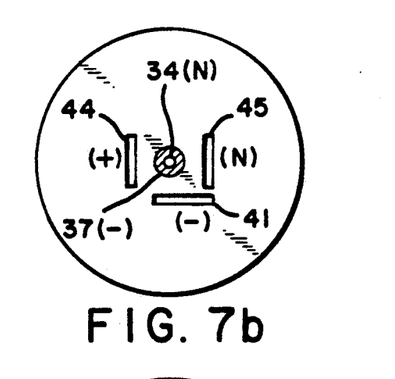

FIGS. 7a and 7b illustrate the orientation of the prongs relative to the slots for parallel electrical connection. Positive electrode prong 39 inserts into positive electrode slot 44 and negative electrode prong 40 inserts into negative electrode slot 41. The cells are thereby electrically connected in parallel.

Figure 7C:
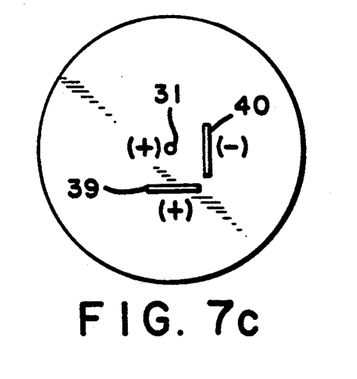
Figure 7D:
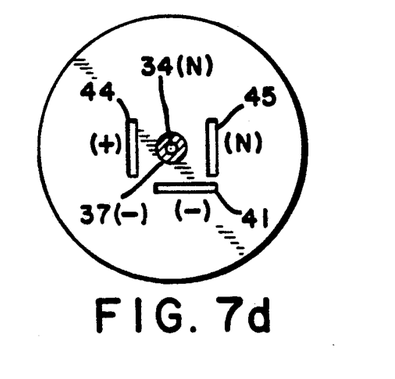

FIGS. 7c and 7d illustrate the orientation of the prongs relative to the slots for series electrical connection. Positive electrode prong 39 inserts into negative electrode slot 41 and negative electrode prong 40 inserts into neutral slot 45. The cells are thereby electrically connected in series.

There are applications where series connection of higher voltage cells must be prevented. In such applications series connection could result in a potential damaging or hazardous situation because of excessive voltage, and the cells must be connected in parallel.

A parallel-connect only cell can be accomplished with minor variations of the series/parallel cells. Further, a parallel-connect only cell can be accomplished with a removable device added to the series/parallel cells. Thus, dual capability can be retained while accidental series connection is prevented. Also, there may be applications where the series capability is preferred. For such applications, a similar device can be added that would prevent accidental connection in parallel.

Figure 8:
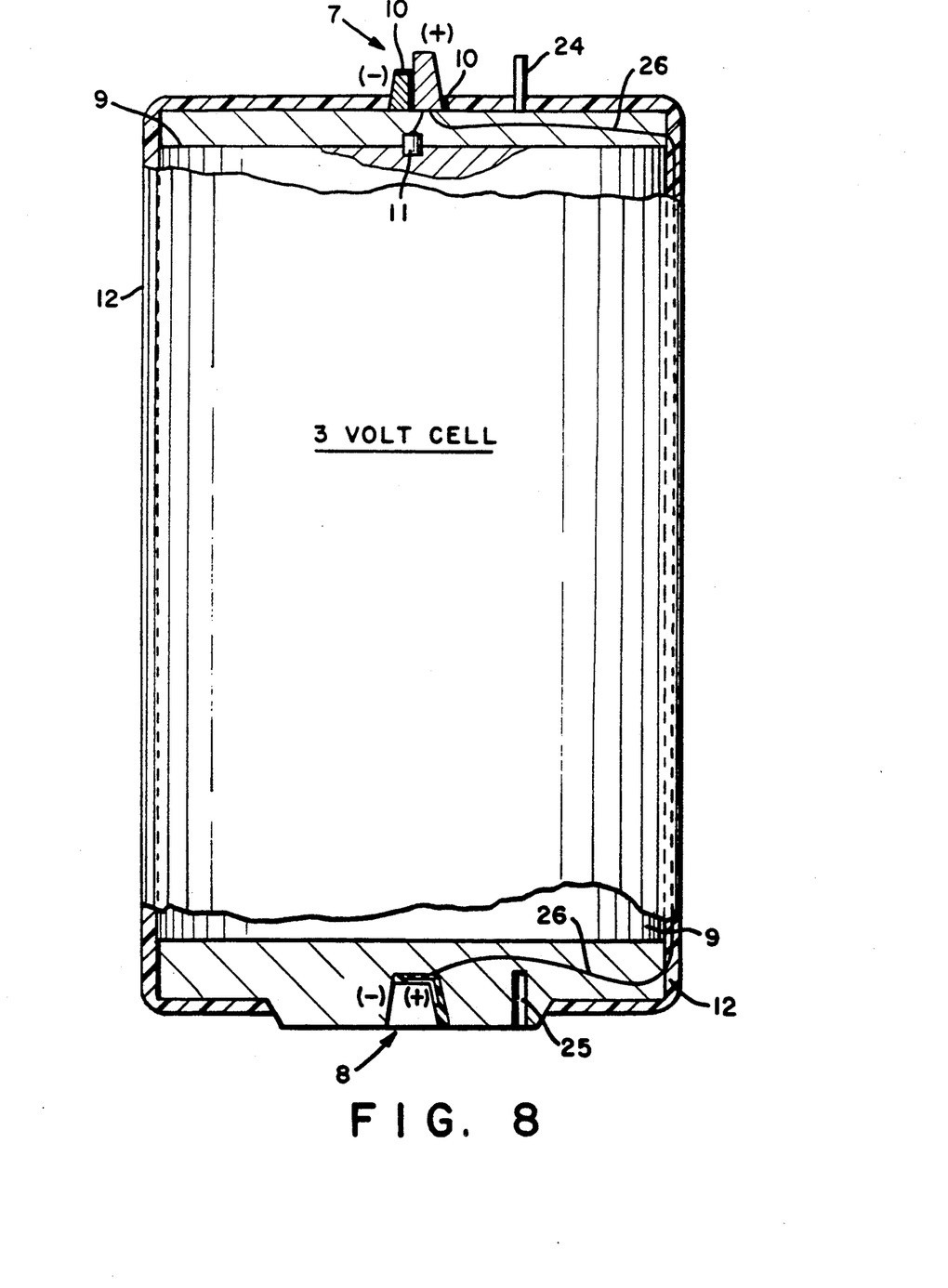
FIG. 8 is a side view of the first embodiment with the addition of a removable locating pin that can be used to either permit parallel or series connection only unless removed.

An optional pin and socket can be incorporated into the series/parallel configurations shown in FIG. 2. This pin and socket device is illustrated in FIG. 8. A pin 24 (which may be removable) is incorporated into one end of the cell and a mating socket 25 is included in the other end. The pin and socket force the cells to be oriented in only one way relative to each other. Thus, the cells can be parallel-connect only or series-connect only. If the pin is removed from the end, the cells can be connected in either series or parallel. This same device can be incorporated in any of the first four embodiments described herein and illustrated in FIGS. 1 through 7.

Further, if parallel-connect only cells that have no capability of series connection are desired, the multi-electrode pin and socket shown in FIGS. 1 through 3 can be made in a shape that permits connection only in one manner.

In the second embodiment depicted in FIG. 4, a partial depth plug can be inserted into the positive electrode portion of socket 36. Such a plug would prevent the cell from being electrically connected in parallel. In the third embodiment depicted in FIG. 6, a half-slot width plate can be inserted into either slot 41 or slot 42 to prevent parallel or series electrical connection, respectively. In the fourth embodiment depicted in FIG. 7, a plate can be inserted into either slot 45 or slot 44 to prevent series or parallel connection, respectively.

In a fifth embodiment of the invention, shown in FIG. 9, a parallel-connect only cell is shown. A central positive electrode pin 31 provides the proper end connection to use in standard electrical devices. This pin is surrounded by an annular negative electrode surface 47 that does not project as far from the end of the cell and which is separated from pin 31 by a nonconducting spacer 48. Positive electrode socket 46 and a negative electrode surface 37 are provided on the opposite end of said cell. Negative electrode surface 37 surrounds socket 46 and provides the standard negative end. Nonconducting portions of positive electrode socket 46 are shown cross-hatched. When the cells are stacked in series, positive electrode pin 31 is in contact with positive electrode socket 46 and negative electrode surface 47 is in contact with negative electrode surface 37. Thus, the cells are electrically connected in parallel.

In a sixth embodiment of the invention, shown in FIG. 10, yet another parallel-connect cell is shown. A central dual electrode pin 51 is provided on one end, wherein part of said pin 51 is a positive electrode 49 and part of said pin 51 is negative electrode 54. The two electrodes are electrically separated by a nonconductor 52. Positive electrode 49 provides the proper end connection to use in standard electrical devices. A negative electrode surface 37 and a dual electrode socket 50 is provided on the other end. The negative electrode surface 37 surrounds the socket 50 and provides the standard negative end. Part of the socket 50 is positive electrode 53 and part of the socket 50 is negative electrode 55. The two electrodes are electrically separated by a nonconductor 56. When the cells are stacked in series, positive electrode part 49 of the pin 51 is in contact with positive electrode portion 53 of the socket 50 and negative electrode part 54 of the pin 51 is in contact with negative electrode portion 55 of the socket 50. Thus, the cells are electrically connected in parallel.

The end of the cell or stack of cells of the type shown in FIGS. 9 and 10 are positive pin 31 (FIG. 9) or positive section 49 of pin 51 (FIG. 10) and negative surface 37. Thus, the battery ends are suited for conventional applications without modification to the electronic devices.

What is claimed:

1. A cell comprising a body containing two or more electroactive materials, said body having both a positive and a negative electrical connecting means on each of opposite ends of said body, which are positioned such that the cells can alternatively be directly electrically connected in either series or in parallel to form a battery power source, said electrical connection being alterable between said series and parallel electrical connection.

2. A cell comprising a body containing two or more electroactive materials, said body having both a positive and a negative electrical connecting means on each of opposite ends of said body, which are positioned such that when two or more of said cells are in coaxial alignment, the cells can alternatively be directly electrically connected in either series or in parallel to form a battery power source, said electrical connection being alterable between said series and parallel electrical connection by separating the cells, rotating at least one of said cells about the axis of the aligned cells, and reconnecting the cells.

3. The cell of claim 2, wherein the central portion of one end of the said cell contains a projecting positive electrode and the opposite end contains a flat negative electrode, so that said cell ends are suited for use in conventional applications without modification to electronic devices used therewith.

4. The cell of claim 3, wherein one end of said cell contains a central two-electrode pin in which electrically insulating means are provided to prevent the two electrodes from shorting each other and to also insulate the top surface of the negative electrode, the opposite end of said cell providing a flat, negative electrode surface with a central, two-electrode socket with electrically insulating means that prevent the electrodes from shorting each other, said electrodes being oriented to permit either series or parallel electrical connection between two coaxial cells depending upon relative rotational orientation.

5. The cell of claim 4, wherein said pin and socket are of rectangular or other cross-section that prevents relative rotation between said cells when they are in electrical connection.

6. The cell of claim 4, combined with a removable pin on one end of said cell and a mating socket on the other end such that said cells can only be connected in parallel unless said pin is removed.

7. The cell of claim 4, combined with a removable pin on one end of said cell and a mating socket on the other end such that said cells can only be connected in series unless said pin is removed.

8. The cell of claim 3, wherein one end of said cell has a central positive electrode pin, a peripheral negative electrode pin, and a peripheral positive electrode pin, said peripheral pins located 180° apart, the opposite end of said cell containing, a flat negative electrode surface, a central insulated socket to receive said central electrode pin, a peripheral positive electrode socket, and a peripheral negative electrode socket, wherein said negative peripheral electrode pin is shorter than said positive peripheral electrode pin and said positive electrode socket is partially non-conducting, such that when said negative electrode is inserted in said positive socket, no electrical contact is made, but when said positive electrode is inserted in said positive socket, an electrical connection is made, and wherein said cells are electrically connected in series when oriented such that said positive peripheral pin is inserted in said negative electrode socket, and are electrically connected in parallel when one of said cells forming a battery is rotated 180° about the central axis from said series position.

9. The cell of claim 8, combined with a removable, nonconducting insert that can be placed in said positive electrode socket that would prevent said cells from being electrically connected in parallel, or placed in said negative electrode socket that would prevent said cells from being electrically connected in series.

10. The cell of claim 8, combined with a removable pin on one end of said cell and a mating socket on the other end such that said cells can only be connected in parallel unless said pin is removed.

11. The cell of claim 8, combined with a removable pin on one end of said cell and a mating socket on the other end such that said cells can only be connected in series unless said pin is removed.

12. The cell of claim 3, wherein plate-shaped prong connectors and slot sockets are used for peripheral electrodes to permit series and parallel electrical connection.

13. The cell of claim 12, wherein on one end of said cell there is a central, positive electrode pin, a peripheral full-width positive plate-shaped prong electrode, and a peripheral negative plate-shaped prong electrode, said peripheral prongs being oriented 180° apart, and on the opposite end of said cell is a flat negative electrode surface, a central electrically insulated socket to receive said central positive electrode pin, a peripheral negative electrode socket, and a peripheral socket that is neutral for more than the width of the peripheral negative prong electrode and a positive electrode for the remainder, said peripheral sockets being oriented 180° apart, wherein said cells are electrically connected in series when oriented such that said positive peripheral electrode is inserted in said negative electrode socket, and in parallel when one of said cells forming a battery is rotated 180° from the series position.

14. The cell of claim 13, combined with a removable, nonconducting insert that can be placed in said positive electrode socket that would prevent said cells from being electrically connected in parallel, or placed in said negative electrode socket that would prevent the cells from being electrically connected in series.

15. The cell of claim 13, combined with a removable pin on one end of said cell and a mating socket on the other end such that said cells can only be connected in parallel unless said pin is removed.

16. The cell of claim 13, combined with a removable pin on one end of said cell and a mating socket on the other end such that said cells can only be connected in series unless said pin is removed.

17. The cell of claim 12, wherein on one end of said cell there is a central, positive electrode pin, a peripheral positive plate-type prong electrode, and a peripheral negative plate-type prong electrode, said peripheral prongs being oriented 90° apart in a specified clock-sense direction when looking at the surface of said end of said cell, and on the opposite end of said cell there being a flat negative electrode surface, a central electrically insulated socket to receive said central positive electrode pin, a peripheral negative electrode socket, and a peripheral socket that is neutral and located 180° from said positive electrode socket and a peripheral socket that is negative and is located 90° in the same clock-sense direction from said neutral socket when looking at the surface of said end of said cell, wherein said cells are electrically connected in series when oriented such that said positive peripheral electrode prong is inserted in said negative peripheral electrode socket and when said negative peripheral electrode prong is inserted in said neutral peripheral electrode socket, and in parallel when one of said cells forming a battery is rotated 90° from the series position and said positive peripheral electrode prong is inserted in said positive electrode socket and when negative peripheral electrode prong is inserted in said negative peripheral electrode socket.

18. The cell of claim 17, combined with a removable, nonconducting insert that can be placed in said positive electrode socket that would prevent said cells from being electrically connected in parallel, or placed in said negative electrode socket that would prevent said cells from being electrically connected in series.

19. The cell of claim 17, combined with a removable pin on one end of said cell and a mating socket on the other end such that said cells can only be connected in parallel unless said pin is removed.

20. The cell of claim 17, combined with a removable pin on one end of said cell and a mating socket on the other end such that said cells can only be connected in series unless said pin is removed.

21. A cell comprising a body containing two or more electroactive materials, said body having both a positive and a negative connecting means on each opposite ends of said body, which are positioned such that when two or more of said cells are in coaxial alignment, the cells are connected in parallel to form a battery.

22. The cell of claim 21, wherein the central portion of one end of said cell contains a projecting positive electrode and the opposite end contains a flat negative electrode, so that the cell ends are suited for use in conventional applications without modification to electronic devices typically used therewith.

23. The cell of claim 22, wherein one end of said cell contains a central, projecting positive electrode and annular negative electrode that projects less than and surrounds said positive electrode, said electrodes being separated by an annular nonconducting element, and the opposite end of said cell contains a flat negative electrode surface and a central positive electrode socket, said electrodes being separated by a nonconducting element to prevent said electrodes from shorting.

24. The cell of claim 22, wherein one end of said cell contains a central projecting pin, the exterior of the end of said pin consisting of a positive electrode, the perimeter of said pin adjacent to the top surface of said cell being a negative electrode, said electrodes being separated by nonconducting elements to prevent shorting, and the opposite end of said cell contains a flat negative electrode surface and dual electrode socket, the deepest part of said socket being a positive electrode, the shallower perimeter of said socket being a negative electrode, said electrodes being separated by nonconducting elements to prevent shorting.

* * * * *